United States Patent [19]

Mazelsky

[11] Patent Number: 5,556,695
[45] Date of Patent: Sep. 17, 1996

[54] DELAMINATING ARMOR

[75] Inventor: Bernard Mazelsky, West Covina, Calif.

[73] Assignee: ARA, Inc., Industry, Calif.

[21] Appl. No.: 412,906

[22] Filed: Sep. 26, 1989

Related U.S. Application Data

[63] Continuation-in-part of Ser. No. 173,400, Mar. 24, 1988, abandoned.

[51] Int. Cl.$^6$ .............. B05D 1/32; B05D 3/10; F41H 1/02; F41H 5/04
[52] U.S. Cl. .............. 428/229; 2/2.5; 156/299; 156/307.4; 156/307.7; 427/300; 427/302; 427/389.8; 427/389.9; 427/407.3; 428/257; 428/246; 428/251; 428/272; 428/273; 428/477.7; 428/475.2; 428/698; 428/902; 428/911
[58] Field of Search .............. 2/2.5; 156/299, 156/307.4, 307.7; 427/300, 302, 389.8, 389.9, 407.3; 428/229, 246, 251, 257, 902, 911

[56] References Cited

U.S. PATENT DOCUMENTS

| | | |
|---|---|---|
| 3,841,954 | 10/1974 | Lawler . |
| 4,522,871 | 6/1985 | Armellino, Jr. .............. 428/252 |
| 4,608,717 | 9/1986 | Dunbavand .............. 2/2.5 |
| 4,780,351 | 10/1988 | Czempoyesh .............. 428/122 |
| 5,229,199 | 7/1993 | Miner et al. .............. 428/902 |

OTHER PUBLICATIONS

Report entitled Fragmentation Resistance Of Fiber Reinforced Ballistic Structures by Edmund A. Merriman and Louis H. Miner of E. I. DuPont de Nemours & Co., Inc. (24 pages).

Paper entitled: "Fragmentation Resistance of Fiber Reinforced Ballistic Structures" by E. A. Merriman and L. H. Miner of E. I. DuPont de Nemours and Co. Inc., presented Oct. 27–29, 1987 at the 10th International Ballistics Symposium of the American Defense Preparedness Association in San Diego, California.

*Primary Examiner*—James C. Cannon
*Attorney, Agent, or Firm*—Boniard I. Brown

[57] ABSTRACT

Absorption retardant substances, such as water-repellents, are applied to ballistic energy absorbing fabric before the fabric is encased in a resin system to form an armor piece. Tiles made from boron carbide, other ceramic material or steel can be attached to or incorporated into the cured resin and fabric system to make composite structural armor pieces. The fabric can be made from polyaramid fibers or fiberglass fibers.

26 Claims, 1 Drawing Sheet

DELAMINATING ARMOR

BACKGROUND OF THE INVENTION

1. Field of the Invention

This is a continuation-in-part of application Ser. No. 07/173,400, filed Mar. 24, 1988, and now abandoned, and this invention relates to armor comprising layers of ballistic energy absorbing fabric set in a resin system. More particularly, the invention concerns composite structural armor with either ceramic or steel plates attached to layers of fabric in a resin system to be used in military aircraft and tanks to stop hostile projectiles.

2. Brief Description of the Prior Art

Composite armor is well known in the military aircraft and vehicle field. Most often some type of ballistic energy absorbing fabric, such as KEVLAR* or SPECTRA** is placed in a resin system to which a ceramic tile or plate of armor steel can also be attached during or after curing. This armor is the so-called "hard armor". Hard armor is used to defeat armor piercing rounds or high energy fragment simulating projectiles.

*Reg. Trademark of Dupont Company
**Reg. Trademark of Allied Chemical Company

Soft armor consisted of layers of ballistic energy absorbing fabric sewn together. Often such soft armor was in the form of vests for protection against low energy threats, such as from hand guns as well as other non-armor piercing rounds such as fragment simulating projectiles having low energy. The fabric in such soft armor configurations, especially KEVLAR fabric, was often treated with chemicals to make it water resistant. This was necessary because of the deterioration of performance whenever the vest or other soft armor got wet due to various environmental conditions such as perspiration, rain, etc.

Soft armor can also be a laminate made up of layers of fabric, not sewn, but assembled in a resin-fabric composite. The additional rigidity due to the resin, in lieu of sewing, offers certain advantages in soft armor applications such as internal "tank liners" or "spall suppression shields" located inside a tank or airplane to suppress damage from fragments. This invention is applicable to this resin-fabric composite.

Problems still remained with the use of armor in military aircraft. Weight was a critical factor, and any reduction in weight for armor, while retaining the same ability to stop projectiles at a given energy, was highly prized. Additionally, SPECTRA (made of polyethylene fiber) suffered from flamability problems, as well as a deterioration of performance at ambient temperatures of around 140° F. or higher. Thus, there still was a need for an armor system using layers of fabric wherein weight could be reduced by using lighter and more efficient delaminating layers of fabric.

OBJECTS AND SUMMARY OF THE INVENTION

An object of the present invention is to provide an armor, whether in a resin system for use in a structural composite armor with accompanying ceramic tile or steel plate, or in a simple non-structural composite armor liner system where the fabric is only bonded with resin, wherein weight can be reduced by providing a more efficient method of stopping a standard energy ballistic threat by causing the delamination of fabric layers to absorb more energy, thereby permitting the use of fewer fabric layers.

It is a further object of this invention to provide an armor having improved performance characteristics at elevated temperatures.

It is yet another object of this invention to provide an armor with a simple weave and large denier to provide for the most efficient use of fabric material in composite armor at minimum cost.

This invention provides armor comprising multiple plies of an energy absorbing cloth made of high strength structural fibers to which a resin has been applied and cured thereon wherein said fibers were treated with a substance serving to retard absorption of a curable resin solution by functioning as a repellent to said solution prior to application of a solution containing curable resin to said treated fibers.

This invention also provides a method for producing armor comprising treating the high strength structural fibers of individual plies of energy absorbing cloth with a substance serving to retard fiber absorption of curable resin solution by functioning as repellent to said solution; thereafter applying a solution containing curable resin to assembled multiple plies of energy absorbing cloth comprising said treated fibers; and curing said resin.

DETAILED DESCRIPTION OF PREFERRED EMBODIMENT

Figure 1:
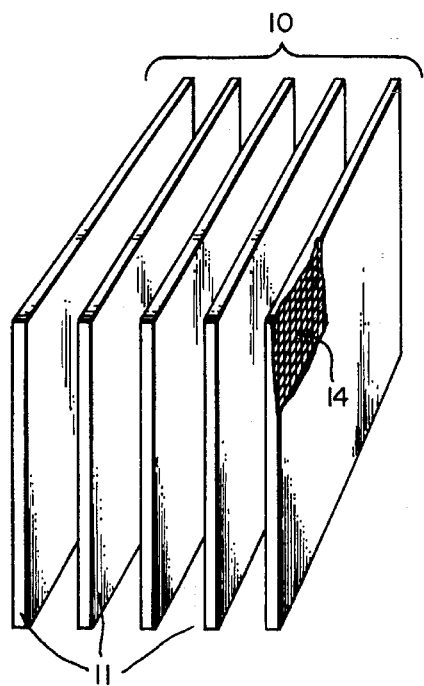
FIG. 1 is an exploded view of one embodiment of the invention, an armor piece that may be either a soft laminate or a hard armor piece.

Ballistic energy absorbing fabric can be made of various fibers. Two of the most popular materials are polyaramid and polyethylene fibers. Dupont polyaramid fiber is sold under the name of KEVLAR, and Allied Chemical polyethylene fiber is sold under name of SPECTRA. The fabric itself can be of many various weaves and deniers. Although a basket weave has been developed for ballistic energy absorbing purposes, a simple weave for polyaramid fibers has been found to be superior when used in accordance with this invention. For fiberglass fibers a basket weave produces good results. Specifically, a simple weave of polyaramid fibers with ten ends and picks per inch, using 3,000 denier thread has been found to give superior performance. An alternate fabric of polyaramid fibers uses a 1,000 denier thread with thirty-one (31) ends and picks per inch in a standard weave. This fabric is considerably more expensive than the 3000 denier fabric. Fabric made from enhanced KEVLAR is available in the 1,000 denier plain weave configuration. Some of the KEVLAR fabric comes with a ZEPEL D* coating. Other KEVLAR fabric comes with no coating.

*Reg. Trademark of Dupont Company

Fabric woven from KEVLAR 29 in a plain weave weighs 8.3 ozs. per square yard. Plain KEVLAR 29 in a 10×10 weave, at 3,000 denier, weighs 8.1 ozs. per square yard. However, in an 8×8 weave the same 3,000 denier fabric weights 6.6 ozs. per square yard.

Fibers made from fiber glass are often coated with special materials before being sent to have the fibers woven into a cloth. The special coating is highly dependant upon the contemplated final use of the woven cloth. In order to form a good bond with various polymer resin solutions, each type of resin solution will have its corresponding special coating for the fiberglass threads. In the case of fiberglass threads to be bonded to an epoxy resin solution, the fibers of fiberglass can have a special coating formulated comprising a propylsilane coupling agent with an excess of diglycidlether of bisphenol A resin. Other types of resin systems will require similar coatings. It should be understood that to practice this invention, the fiberglass fibers have a coating put on them that can include a starch and oil coating. This starch and oil and coating allows easier weaving. However, when the fiberglass is woven into fabric without further coating beyond the starch and oil coating and used as such, the ballistic performance is not enhanced. Instead the invention is better practiced when the absorbent retardant substance is applied on top of any resin compatible coating and starch and oil coating. A fiberglass treated with the propylsilane coupling agent is often referred to in the trade as 901-S glass, which can be obtained from Owens Corning Fiberglass. A commercial fiberglass cloth is made from S-2 fiberglass. S-2 fiberglass is recognized as the commercial version of the S-901 fiberglass fabric made in accordance with military specifications. S-2 fiberglass fibers can also be coated to make the woven cloth compatible with polyester or vinyl resins. Owen Corning finish #463 improves fiberglass fabric ballistic performance when used with polyester resins to make a cured armor piece.

When bonding a ceramic tile, which can be made of silicon carbide, a polysulfide adhesive or equivalent adhesive can be put on the outer fiberglass layer to effect bonding.

Referring now to the drawings, FIG. 1 shows an exploded view of an armor piece 10 that may be either a soft laminate or a hard armor piece. Individual plies of fabric 11 have been treated with an absorption retardant substance. The number of plies of fabric shown in the drawing is arbitrary, and will probably be far higher. The weaving of the fabric ply is shown in enlarged detail 14. The cured resin will be between the individual plies of fabric, but it has not been shown because it is not visible to the eye when examining an armor piece.

Figure 2:
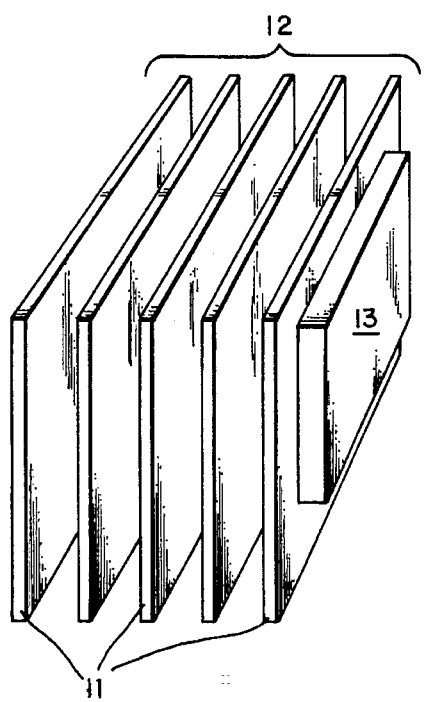
FIG. 2 is an exploded view of another embodiment of the invention, a hard armor piece with an attached tile.

FIG. 2 shows an exploded view of an armor piece 12 with individual plies of fabric 11. To the front of the armor piece 12 is an armor tile 13. In an actual armor piece, this tile 13 can be ceramic or steel, and is attached by, for example, gluing to the plies of fabric 11 which have been laminated together by cured resin (not shown). It should be understood that the thickness of the plies of fabric 11 has been greatly enlarged for illustrative purposes in FIGS. 1 and 2.

To make an armor piece, either with or without a panel of steel attached, it is necessary to encase the woven fabric layers in a resin system. After the fabric has been treated in accordance with the invention, as described below, resin may be applied through any of a number of standard techniques well known to those skilled in the armor manufacturing art. One standard technique is to brush or spray each fabric layer with the desired resin. The resins often are polyester resins, specifically Kopper's 631 polyester resin, with or without styrene inputs. A 12"×12" fabric panel would typically be sprayed with 132 grams of the resin. After spraying each layer and combining the desired number of plies into an armor piece, the piece is autoclaved at 135 PSI, and at 200°–240° F. Later, for some armor pieces, tiles such as boron carbide tiles can be bonded to the product from the autoclave using an epoxy glue such as Goodrich A1423, applied at about 0.08 lbs. per square foot.

Ballistic energy absorbing fabric can be purchased from either the manufacturer of the thread or the weaver with water-repellant treatment already in place. Most absorbent retardant substances are water-repellant treatment chemicals. However, the fabric after weaving can also be treated with water-repellant by the armor maker. DuPont, the maker of KEVLAR, will supply fabric with ZEPEL D water-repellant (a fluoraliphatic compound) treatment to an armor manufacturer. However, independent application of the absorption retardant substances by the armor maker using either an aerosol or bath application technique is also feasible. Each fabric layer can be sprayed with aerosol cans or other similar spray apparatus, to apply the water-proofing compounds. Typically, the water-repellant chemical applied by spray techniques is a siliconate—specifically, a sodium siliconate. However, some water-repellant chemicals can be purchased in carriers such as a chlorinated ethylene compound that allows the application to fabric to be accomplished by being drawn through a bath of the water-proofing chemical and carrier. After leaving the bath, the fabric is often run between two rollers to squeeze out any excess water-proofing chemical. A typical water-repellant is sodium methyl siliconate in tetrachloroethylene carrier. Dow Corning 772 water-repellant is a commercially available sodium methyl siliconate. In any case, the carrier must be allowed to evaporate. The carriers' characteristics will determine the length of time needed to allow thorough evaporation. This time can range from a few minutes to requiring heat treatment in an oven at 350° F. for one to two hours.

After the armor piece is manufactured, it is necessary to test the armor in a standard way. To test for a high energy threat, a 0.50 caliber 207 grain fragment simulating projectile (FSP) is shot at the targets at approximately 3,000 feet per second. The other characteristics of fragment simulating projectiles are described in standard MIL-P-46593A (MU). The fragment is fired from an appropriate size gun barrel using a custom made gunpowder charge in a cartridge. The amount and type of gunpowder to be used to obtain a certain speed are calculated according to methods well known to those skilled in the ballistic testing art. The speed of the projectile was measured by measuring travel time between two photocells a known distance apart, which is accurate within plus or minus 0.1%. The arrangement of the measuring equipment and methods used to calculate the speed are again well known to those skilled in the

EXAMPLE I

| SHOT NO. | VELOCITY | RESULT | FABRIC NOMEN- CLATURE | FABRIC SPECI- FICATIONS | RESIN CONTENT | LAM. THICK- NESS (Inches) | LAM. AERIAL DENSITY (lbs./ft.$^2$) | TILE SIZE (Inches) |
|---|---|---|---|---|---|---|---|---|
| 1 | 3029 FPS | PP | 9 plies SPECTRA 1000, plain weave | 15.1 oz., 650 den. .037 thk. | 24.9% | .255 | 1.30 | .449 × 5.9 × 6.0 |
| 2 | 3051 FPS | CP | Same as above | Same as above | 24.4% | .261 | 1.26 | .445 × 5.4 × 5.5 |
| 3 | 3091 FPS | PP | Same as above | Same as above | 28.8% | .277 | 1.38 | .455 × 5.4 × 5.8 | ballistic testing art.

The armor piece is held in a ballistic frame standard throughout the test period. The frame can accommodate various thicknesses of armor pieces. However, all armor pieces tested are 12" wide×12" high, i.e., one square foot. The frame is sturdy enough to present the armor piece to the incoming projectile in such a way that the armor piece is not allowed to fold in upon itself. The armor piece, with a panel attached, is held in the ballistic frame in such a way that the tile is impacted first by the incoming projectile. The armor piece test is declared successful when the projectile only partially penetrates (PP) the armor piece. However, when the projectile emerges from the other side of the armor piece, the test is declared a complete penetration (CP) and, hence, a failure.

The first series of tests were done with 0.50 caliber 207 grain fragment simulating projectiles fired at speeds of around 3,000 feet per second. The table designated EXAMPLE I on the following page shows the results when SPECTRA is used.

The table designated EXAMPLE II on the following page shows test results when a 0.30 caliber armor piercing projectile was shot at speeds around 2,700 feet per second. Lines 1–6 resulted from testing KEVLAR fiber coated with ZEPEL D water-resistant compound. Lines 1–6 resulted from KEVLAR fibers treated with a mixture of 12 parts of Dupont's ZEPEL 7040, 20 parts Dupont NALAN

EXAMPLE II

| VELOCITY | RESULT | FABRIC NOMENCLATURE | FABRIC SPECIFICATIONS | *AMBIENT FABRIC | *DRIED FABRIC | *COATED FABRIC | *WET LAY-UP | *LAM. | RESIN CONTENT | LAM. THK. | LAM.* A.D. |
|---|---|---|---|---|---|---|---|---|---|---|---|
| 2717 FPS | PP | 20 plies KEVLAR 29, 10 × 10 weave | 8.1 oz., 3000 den. .014 thk. | 508.0 | 482.8 | 524.3 | 604.2 | 595.9 | 12.0% | .222 | 1.31 |
| 2721 FPS | PP | Same as above | Same as above | 508.1 | 480.5 | 520.6 | 606.7 | 597.0 | 12.8% | .218 | 1.38 |
| 2739 FPS | CP | Same as above | Same as above | 510.1 | 484.8 | 524.6 | 591.4 | 582.2 | 9.9% | .223 | 1.28 |
| 2706 FPS | CP | 24 plies KEVLAR 29, 8 × 8 weave | 6.6 oz., 3000 den. .012 thk. | 500.5 | 476.6 | 516.2 | 618.2 | 608.0 | 15.1% | .216 | 1.34 |
| 2728 FPS | CP | Same as above | Same as above | 500.1 | 476.1 | 517.7 | 588.7 | 593.0 | 12.7% | .216 | 1.31 |
| 2688 FPS | PP | Same as above | Same as above | 501.1 | 477.8 | 513.1 | 598.5 | 585.0 | 12.3% | .210 | 1.29 |
| 2728 FPS | PP | 20 plies KEVLAR 29, 10 × 10 weave | 8.1 oz., 3000 den. .014 thk. | 511.6 | 485.3 | 506.5 | 613.9 | 607.5 | 16.6% | .221 | 1.34 |
| 2734 FPS | CP | Same as above | Same as above | 509.2 | 485.5 | 505.8 | 598.8 | 569.4 | 11.2% | .222 | 1.25 |
| 2684 FPS | PP | Same as above | Same as above | 511.3 | 485.6 | 502.6 | 582.5 | 588.0 | 14.5% | .220 | 1.30 |
| 2726 FPS | CP | 24 plies KEVLAR 29, 8 × 8 weave | 6.6 oz., 3000 den. .012 thk. | 494.2 | 471.6 | 488.8 | 594.5 | 573.3 | 14.7% | .221 | 1.26 |
| 2693 FPS | CP | Same as above | Same as above | 495.3 | 472.0 | 495.5 | 620.8 | 604.5 | 18.0% | .218 | 1.33 |
| 2675 FPS | PP | Same as above | Same as above | 498.6 | 475.2 | 499.9 | 596.5 | 587.5 | 14.9% | .220 | 1.29 |

*Weight in grams
**Inches
***lbs./ft.²

W*, and one part isopropyl alcohol. The KEVLAR fabric in lines 7–12 was treated with a silicone coating supplied by Amazing Brand (of Los Angeles, Calif.) in an aerosol spray can under the label "Amazing Fabric Guard". It also should be noted that the fabric plies were dried to remove moisture before the water-repellant coatings were applied.

*Reg. Trademark of Dupont Company

As can be seen from the prior table, the performance of armor made with KEVLAR fabric, when treated in accordance with this invention, equals that of the armor made with SPECTRA fabric in resisting penetration at about equivalent thicknesses. But the laminate aerial density of armor made with KEVLAR (3000 denier in a 4×4 basket weave) not treated in accordance with this invention, would have to be 1.8 lbs./square feet, and the laminate thickness would have to be approximately 0.275 inches to equal the performance of the SPECTRA armor in the previous table. The present cost of comparable fabric is approximately $16.00 per pound for 3000 denier KEVLAR woven in a plain weave and treated in accordance with the invention, as compared to approximately $45.00 per pound for the SPECTRA. Such costs are subject to change in the future. Thus, armor made with KEVLAR fabric treated in accordance with the invention can equal the performance of armor made with SPECTRA fabric, while laminate aerial density remains approximately equal, but costs are drastically reduced. This benefit of KEVLAR is in addition to the avoidance of SPRECTRA's flamability and higher temperature performance problems mentioned earlier.

This invention also allows KEVLAR to overcome some differences with SPECTRA based on tensile strength. The tensile strength of SPECTRA model 1000 is 435,000 lbs./square inches as compared with KEVLAR's (29 or 49) tensile strength of 406,000 lbs./square inches. Since the specific gravity of the SPECTRA fabric is 0.035 lbs./cubic inches and of KEVLAR is 0.052 lbs./cubic inches, the strength-to-weight ratio is 12,429,000 for SPECTRA and 7,808,000 for KEVLAR. The comparison of these two ratios finds SPECTRA 1.59 times more efficient in stopping ballistic threats than KEVLAR. The 1.59 number is for plain weave, whereas basket weave SPECTRA is 1.56 times more efficient than basket weave KEVLAR. However, when the KEVLAR is treated in accordance with the invention, this disparity in efficiency is eliminated.

A separate test was run to determine the characteristics of the armor laminates when exposed to a temperature of 175° F. It was found that the laminates with the ZEPEL coating demonstrated thermal instability by becoming soft and flexible, allowing the fabric plies to be easily separated. Such performance at this temperature would render the armor pieces unsatisfactory for use in such applications as military aircraft and/or land vehicles such as tanks. An examination of the armor pieces made with fabric coated by Amazing Brand silicone showed no significant degradation at 175° F.:

Another series of tests was run on fiberglass ballistic cloth bonded to a silicon carbide ceramic tile with polysulfide. For all 6 shots the ceramic tile measured 6.0×6.0×0.320–0.329 inches. The fiberglass cloth was a basket weave of S-901 fiber glass obtained from Owens Corning that weighed 24 oz. per squ. yd. The armor pieces were made of 14 plies of fabric with a polyester resin content of from 20–25%. The test pieces were a standard 12 inches by 12 inches and had an average thickness of 0.32 inches and an average aerial density of 2.75 lbs/sq. ft. The ballistic test was also conducted as described before. Example III presents the data obtained from the test firings. The first three shots represent the results of the 0.30 caliber armor piercing projectile fired at an untreated (i.e. the fiberglass cloth plies were not treated with an absorption retardant substance) armor piece. The last three shots represent the results from the same threat fired at armor pieces (that included the treatment of the fiberglass cloth plies with absorption retardant substance) armor piece.

Example III

| Shot No. | Velocity (FPS) | Result | Absorbtion Retardant Treatment |
| --- | --- | --- | --- |
| 1 | 2702 2697 | CP | untreated |
| 2 | 2670 2666 | PP | untreated |
| 3 | 2632 2626 | PP | untreated |
| 4 | 2691 2686 | PP | treated |
| 5 | 2732 2726 | PP | treated |
| 6 | 2866 2861 | CP | treated |

As can be seen from the test results the average velocity of the armor piercing round for the armor pieces not treated in accordance with the invention was 2663 feet per second. This value is based on the lower of the two velocities measured for each shot. However the armor pieces when treated in accordance with the invention had an average velocity of 2758 feet per second and the same results, i.e. two partial penetrations and a complete penetration, were obtained. This velocity value is also based on the lower of the two velocities measured for each shot and shown in Example III. In this example, the silicon coating, "amazing fabric guard", was applied by aerosol spray.

I claim:
1. Armor comprising:
   multiple plies of an energy absorbing cloth made of high strength structural fiberglass fibers to which a resin has been applied and cured thereon wherein said fibers were treated with a substance serving to retard absorption of a curable resin solution by functioning as a repellent to said solution prior to application of a solution containing curable resin to said treated fibers, said fibers having a coating of a coupling agent used to promote bonding with said curable resin.
2. The armor of claim 1 wherein said coupling agent is a propylsilane coupling agent with an excess of diglycidylether of bisphenol A resin.
3. Armor comprising:
   multiple plies of an energy absorbing cloth made of high strength structural fibers to which a resin has been applied and cured thereon wherein said fibers were treated with a silicone compound serving to retard absorption of a curable resin solution by functioning as a repellent to said solution prior to application of a solution containing curable resin to said treated fibers.
4. The armor of claim 3 wherein said silicone compound is applied to said fibers while said silicone compound is dissolved in a volatile solvent.
5. The armor of claim 4 wherein said solvent is tetrachloroethylene.
6. Armor comprising:
   a tile attached to multiple plies of an energy absorbing cloth made of high strength structural fibers to which a resin has been applied and cured thereon wherein said fibers were treated with a substance serving to retard absorption of a curable resin solution by functioning as a repellent to said solution prior to application of a solution containing curable resin to said treated fibers.

7. The armor of claim 6 wherein said fibers comprised polyaramid fiber.

8. The armor of claim 6 wherein said fibers comprise fiberglass.

9. The armor of claim 8 wherein said fibers further have a coating of a coupling agent used to promote bonding with said curable resin.

10. The armor of claim 9 wherein said coupling agent is a propylsilane coupling agent with an excess of diglycidylether of bisphenol A resin.

11. The armor of claim 6 wherein said resin solution contains polyester resin.

12. The armor of claim 10 wherein said resin solution is cured by placing resin solution and cloth in an autoclave and heating said autoclave to 200°–240° F. at 135 PSI.

13. The armor of claim 6 wherein said tile is metallic.

14. The armor of claim 13 wherein said tile is made of steel.

15. The armor of claim 6 wherein said tile is ceramic.

16. The armor of claim 15 wherein said tile is made of boron carbide.

17. The armor of claim 6 wherein said absorption retardant is a fluoraliphatic compound.

18. The armor of claim 6 wherein said absorption retardant is a silicone compound.

19. The armor of claim 18 wherein said silicone compound is applied to said fibers while said silicone compound is dissolved in a volatile solvent.

20. The armor of claim 19 wherein said solvent is tetrachloroethylene.

21. The armor of claim 6 wherein said energy absorbing cloth is woven in a plain weave.

22. The armor of claim 6 wherein said energy absorbing cloth is woven in a basket weave.

23. A method of producing armor comprising:

treating the high strength structural fibers of individual plies of energy absorbing cloth with a substance serving to retard fiber absorption of curable resin solution by functioning as a repellent to said solution; thereafter applying a solution containing curable resin to assembled multiple plies of energy absorbing cloth comprising said treated fibers; including a tile in said assembled multiple plies of energy absorbing cloth and resin solution before the resin solution is cured; and curing said resin.

24. A method of producing armor comprising:

treating the high strength structural fibers of individual plies of energy absorbing cloth with a substance serving to retard fiber absorption of curable resin solution by functioning as a repellent to said solution; thereafter applying a solution containing curable resin to assembled multiple plies of energy absorbing cloth comprising said treated fibers; curing said resin; and attaching a tile to said cured resin and assembled multiple plies of energy absorbing cloth.

25. A method of producing armor comprising:

treating the high strength structural fiberglass fibers of individual plies of energy absorbing cloth with a substance serving to retard fiber absorption of curable resin solution by functioning as a repellent to said solution, said fibers having a coating of a coupling agent used to promote banding with said curable resin; and curing said resin.

26. The method of claim 5 wherein said coupling agent is a propylsilane coupling agent with an excess of diglycidylether of bisphenol A resin.

* * * * *

UNITED STATES PATENT AND TRADEMARK OFFICE
CERTIFICATE OF CORRECTION

PATENT NO. : 5,556,695
DATED : Sept. 17, 1996
INVENTOR(S) : Mazelsky, Bernard

It is certified that error appears in the above-indentified patent and that said Letters Patent is hereby corrected as shown below:

Column 12, line 31, change "claim 5" to --claim 25--.

Signed and Sealed this

Twenty-sixth Day of November 1996

*Attest:*

BRUCE LEHMAN

*Attesting Officer*    *Commissioner of Patents and Trademarks*